J. T. OBENCHAIN.
Grinding-Mill.

No. 215,658. Patented May 20, 1879.

Witnesses:
J. W. Garner
W. S. D. Haines

Inventor:
Jno. T. Obenchain
per
F. A. Lehmann,
Att'y

N. PETERS, PHOTO-LITHOGRAPHER, WASHINGTON, D. C.

UNITED STATES PATENT OFFICE.

JOHN T. OBENCHAIN, OF LOGANSPORT, INDIANA.

IMPROVEMENT IN GRINDING-MILLS.

Specification forming part of Letters Patent No. 215,658, dated May 20, 1879; application filed April 7, 1879.

*To all whom it may concern:*

Be it known that I, JOHN T. OBENCHAIN, of Logansport, in the county of Cass and State of Indiana, have invented certain new and useful Improvements in Grinding-Mills; and I do hereby declare the following to be a full, clear, and exact description of the invention, such as will enable others skilled in the art to which it pertains to make and use it, reference being had to the accompanying drawings, which form part of this specification.

My invention relates to an improvement in grinding-mills; and it consists in the arrangement and combination of parts, that will be more fully described hereinafter, whereby the whole mechanism for running the mill is placed down under the floor, and the stones are automatically made to adjust themselves to each other.

Figure 1:
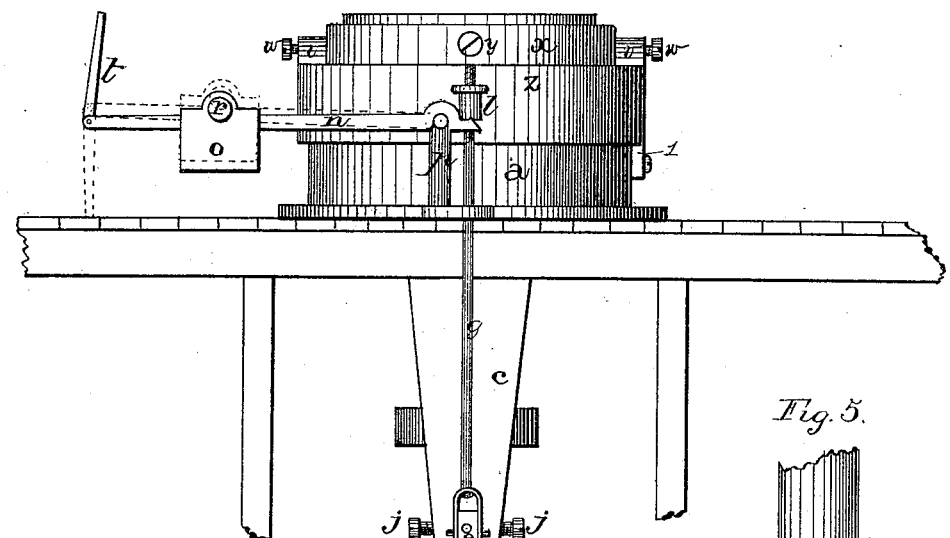
Figure 2:
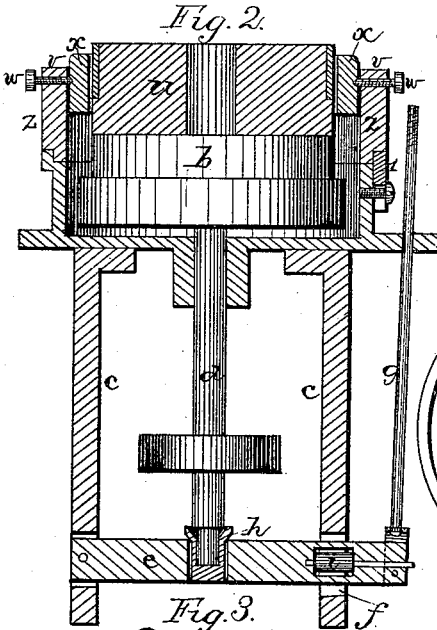
Figure 4:
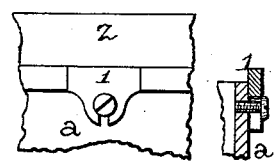

Figure 1 is a side elevation of my invention. Fig. 2 is a vertical section of the same; and Figs. 3, 4, 5, 6, 7 are detail views of different parts.

$a$ represents the frame, in which the lower stone, $b$, rigidly secured to the shaft, so as to run at a high rate of speed, is placed. This frame is placed on the floor of the mill, at a convenient spot, over a hole of suitable size to let the two hangers $c$, secured to the under side of the frame, and the shaft $d$, which runs the stone $b$, pass down through into the gear-pit below. These two hangers $c$ form a support for the lighter-bar, $e$, which is pivoted at one end in one of the hangers, and passes outward through a slot, $f$, in the other, in which slot this free end of the lighter-bar is adjusted up and down by the lighter-screw, $g$, for the purpose of adjusting vertically the lower stone.

The draft of the belt coming from one side on the lighter-bar, the roller $i$ serves to prevent the end of the lighter-bar from binding against the support, as it otherwise would do, and thus making it difficult to move. The absolute necessity of this easy adjustment of the end of the bar up and down will be seen when it is intended to have the lower stone self-adjusting. Should a nail, piece of wire, or other hard substance get between the stones, the lower stone must instantly drop down far enough to let the substance escape without injuring the dress of the stone, and this the stone cannot do unless the roller $i$ is used.

In order to make this lighter-bar move as easily as possible, and keep the spindle or shaft $d$ from having a lateral play at its lower end, the roller $i$ is journaled in the lighter-bar in a line with its length, and this roller bears against the sides of the slot $f$, and thus holds the lighter-bar always true.

Figure 5:
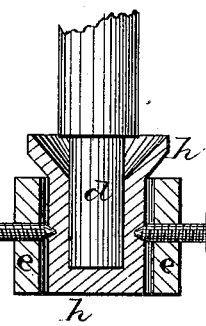

The step $h$ fits in a hole in the lighter-bar, and is supported in position by means of two set-screws, $j$, which pass through the lighter-bar at right angles to its length, as shown in Fig. 5, and thus allows the step a balancing-movement, so that whether the lighter-bar is raised or lowered this step always maintains a vertical position in line with the spindle. By thus placing the step upon the lighter-bar the usual bridge-tree is entirely dispensed with, and the lighter-bar is made to perform the double function of supporting the shaft and adjusting vertically the lower stone.

By the construction above described, it will be seen that all the machinery for running the mill is placed below the floor, and nothing outside of the adjusting devices is visible. The power for running the spindle may be applied by means of a belt from any suitable source, or by any other means that may be preferred.

The upper end of the lighter-screw projects up through the floor beside the mill, and receives the adjusting-nut $l$, under which the knife-edge of the lever $n$ catches, as shown in Fig. 1. This lever is pivoted upon a suitable standard or support, $p$, and has the movable weight $o$ placed upon it, for adjusting the force with which the lower movable stone shall bear up against the upper one.

In order to make the weight as easily adjustable as possible a friction-roller, $r$, is used, which has a groove cut in its surface to fit over the top of the lever $n$ and prevent the roller from being drawn out of the weight while the weight is upon the lever. This roller $r$ also has a head formed on one end, by means of which the roller can be turned around, and thus made to move the weight back and forth, as may be desired.

To the outer end of the lever $n$ is pivoted the supporting-rod $t$, which serves to support the lever $n$ at such an elevated height as to allow the lighter-bar to sink far enough down to drop the lower stone out of contact with the upper one. This is done when the lower stone is running but not grinding.

In this mill the upper stone, $u$, does not revolve, while the lower one does; but while the lower stone is rigid upon its spindle, the upper one is made movable enough to adapt itself to any position the lower stone may assume. This automatic tramming is accomplished in the following manner: Upon the upper part of the frame are formed the two ears $v$, on opposite sides of the frame, through which ears pass the screws $w$, which form the pivots for the ring $x$ to turn upon. The distance this ring shall turn or rock upon these pivots is regulated by the two stops $y$, which strike against the top surface of the upper part of the frame $z$ on opposite sides. These stops $y$ are the outer ends of set-screws, which in turn form the pivots for the upper stone to turn or rock upon. These pivots for the ring $x$ and upper stone being placed at right angles to each other, it will readily be seen that the upper stone has enough of a universal motion to quickly adjust itself to the under stone whenever the two are brought in contact. No matter in which direction the under stone may incline, this upper stone will at once adjust itself to it as accurately as can be accomplished by the most delicate apparatus. Owing to this perfect automatic adjustment of the stones they need no watching, and seldom wear themselves out of true, for any wear on one side of one stone is quickly taken up by the other.

In order to dispense with the usual curb, which is placed over the stone to prevent the escape of any of the flour-dust as the grain is being ground, the ring $x$ is made to fit inside of the upper part of the frame $z$, and the band around the upper part of the upper stone is made to fit inside of the ring $x$ just tight enough to allow the upper stone to adjust itself, and yet allow no dust to escape around them. Just after the mill is first started in operation the flour-dust escapes around the ring for a few moments, and then the dust fills up the space around it, so that no more dust can escape. This dust makes an excellent sealing medium at the same time that it is sufficiently soft to allow the upper stone to adjust itself to the lower one. In this manner the upper surface of the stone $u$ is always uncovered, and the mere frame alone is made to answer all the purposes of an expensive curb.

By using set-screws having pointed ends, as herein shown, the upper stone can be adjusted laterally, so that there will be a perfect fit all around inside of the ring and all around the ring inside of the frame, and thus not have them binding or catching on one side.

Where simple pivots are used for the ring and stone to turn upon these parts cannot be made tight, and hence a curb must be placed over their tops.

Figure 7:
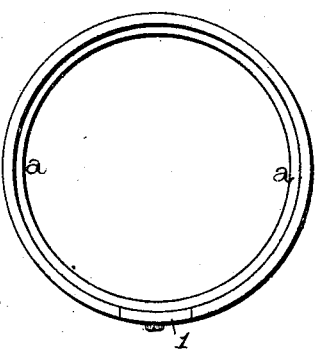
Figure 3:
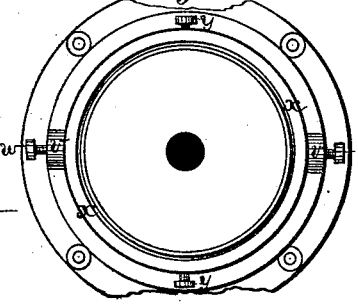

In order to adjust the red-staff at right angles to the axis of the revolving stone when dressing is required, an adjustable plate, 1, is inserted in the side of the frame $a$, as is shown in Figs. 2, 6, and 7. The upper end of this plate projects above that portion of the frame that is cut away at this point, and can be raised and lowered to any degree that may be found necessary. When the red-staff is placed across the top of the frame $a$, one end resting upon the frame on one side and the other upon the plate 1, should it be found that the staff is higher on one side than the other, it is only necessary to raise or lower the plate to bring the red-staff at a right angle to the axis of the stone. Then, by revolving the stone under the staff, instead of turning the staff around on the stone, all irregularities will at once be marked by the red on the staff.

Having thus described my invention, I claim—

1. In combination with the stationary stone supported in universal bearings, the runner-stone and spindle mounted in an oscillating bearing or step in the pivoted lighter-bar, substantially as and for the purpose set forth.

2. The combination of the supports $c$, lighter-bar $e$, step $h$, and pivots $j$, for the purpose substantially as set forth.

3. The combination of the lever $n$, weight $o$, and roller $r$, having a groove in its surface to catch over the lever and a head on one end to move the roller back and forth on the lever, substantially as specified.

4. The combination, with the two stones, shaft, and lighter bar, of the lever $n$, weight $o$, and supporting-rod $t$, pivoted to the end of the lever, whereby, when the end of the lever is raised upward, the lower stone drops down out of contact with the upper stone, substantially as shown.

5. The combination of the case $a$, stone $b$, shaft $d$, and adjustable plate 1, whereby the red-staff can be adjusted at right angles to the shaft, substantially as described.

6. In a grinding-mill, the combination of the frame $z$, ring $x$, stone $u$, and set-screws $w$ $y$, the parts being so constructed and arranged that the flour and dust will seal the joints around the ring, and thus enable a curb to be dispensed with, substantially as set forth.

In testimony that I claim the foregoing I have hereunto set my hand this 7th day of April, 1879.

JOHN T. OBENCHAIN.

Witnesses:
W. S. D. HAINES,
WILLIAM FITCH.